US010031015B2

(12) United States Patent
Centioli et al.

(10) Patent No.: US 10,031,015 B2
(45) Date of Patent: Jul. 24, 2018

(54) BEVERAGE MULTI-TOOL

(71) Applicant: Quercus, LLC, Seattle, WA (US)

(72) Inventors: Samuel Centioli, Seattle, WA (US); Conan Storlie, Seattle, WA (US)

( * ) Notice: Subject to any disclaimer, the term of this patent is extended or adjusted under 35 U.S.C. 154(b) by 192 days.

(21) Appl. No.: 14/952,972

(22) Filed: Nov. 26, 2015

(65) Prior Publication Data

US 2016/0081516 A1 Mar. 24, 2016

Related U.S. Application Data

(63) Continuation-in-part of application No. 29/543,453, filed on Oct. 23, 2015.

(51) Int. Cl.
*B67D 7/76* (2010.01)
*G01F 19/00* (2006.01)
*C12G 3/07* (2006.01)

(52) U.S. Cl.
CPC ............. *G01F 19/00* (2013.01); *C12G 3/065* (2013.01)

(58) Field of Classification Search
CPC ... G01F 19/00; B01F 13/0028; B01F 13/0022
USPC ........................................................ 222/190
See application file for complete search history.

(56) References Cited

U.S. PATENT DOCUMENTS

| 2,114,009 | A | 4/1938 | Ramsay |
| 2,722,153 | A | 11/1955 | Greco |
| D221,201 | S | 7/1971 | Gordon |
| 3,942,423 | A | 3/1976 | Herzfeld |
| 7,527,180 | B2 | 5/2009 | Allen et al. |
| 8,245,882 | B1 | 8/2012 | Federighi |
| 8,517,350 | B2 | 8/2013 | Tsai et al. |
| 8,523,019 | B2 | 9/2013 | Drobot et al. |
| 8,807,358 | B2 | 8/2014 | Devoy et al. |
| 2007/0211562 | A1 | 9/2007 | Pitsis |
| 2008/0116164 | A1* | 5/2008 | Dellinger ............... B65D 41/26 215/228 |
| 2008/0219092 | A1 | 9/2008 | Clement |
| 2012/0156345 | A1 | 6/2012 | Agarwal et al. |
| 2013/0045300 | A1 | 2/2013 | Robillard |
| 2014/0131303 | A1 | 5/2014 | Mulac |

(Continued)

FOREIGN PATENT DOCUMENTS

WO 2011141773 A1 11/2011

*Primary Examiner* — Jeremy W Carroll
(74) *Attorney, Agent, or Firm* — Puget Patent; Michael Gibbons

(57) ABSTRACT

A beverage multi-tool includes an appliance and a cap. The appliance functions as a stopper, pourer, aerator and muddler. The appliance is made primarily of wood, specifically of oak or another wood with flavor enhancing properties for a liquid such as liquor or wine. A rubber or other compressible-material grommet is disposed at an end of the appliance adjacent to the pourer. The grommet has a plurality of concentric rings. A cap may be included which functions as a shot measurer and/or shot glass. The cap is held in place by concentric rings about the grommet closest to the pourer, the rings being slightly larger in diameter than an inner diameter of a receptacle of the cap. Other concentric rings disposed opposite the pourer end may have different diameters and are configured for fitting bottles having a variety of neck inner diameters. An air channel acts as a vacuum breaker.

6 Claims, 9 Drawing Sheets

(56) References Cited

U.S. PATENT DOCUMENTS

2015/0056332 A1\* 2/2015 Gold .................... B65D 77/22
426/87

\* cited by examiner

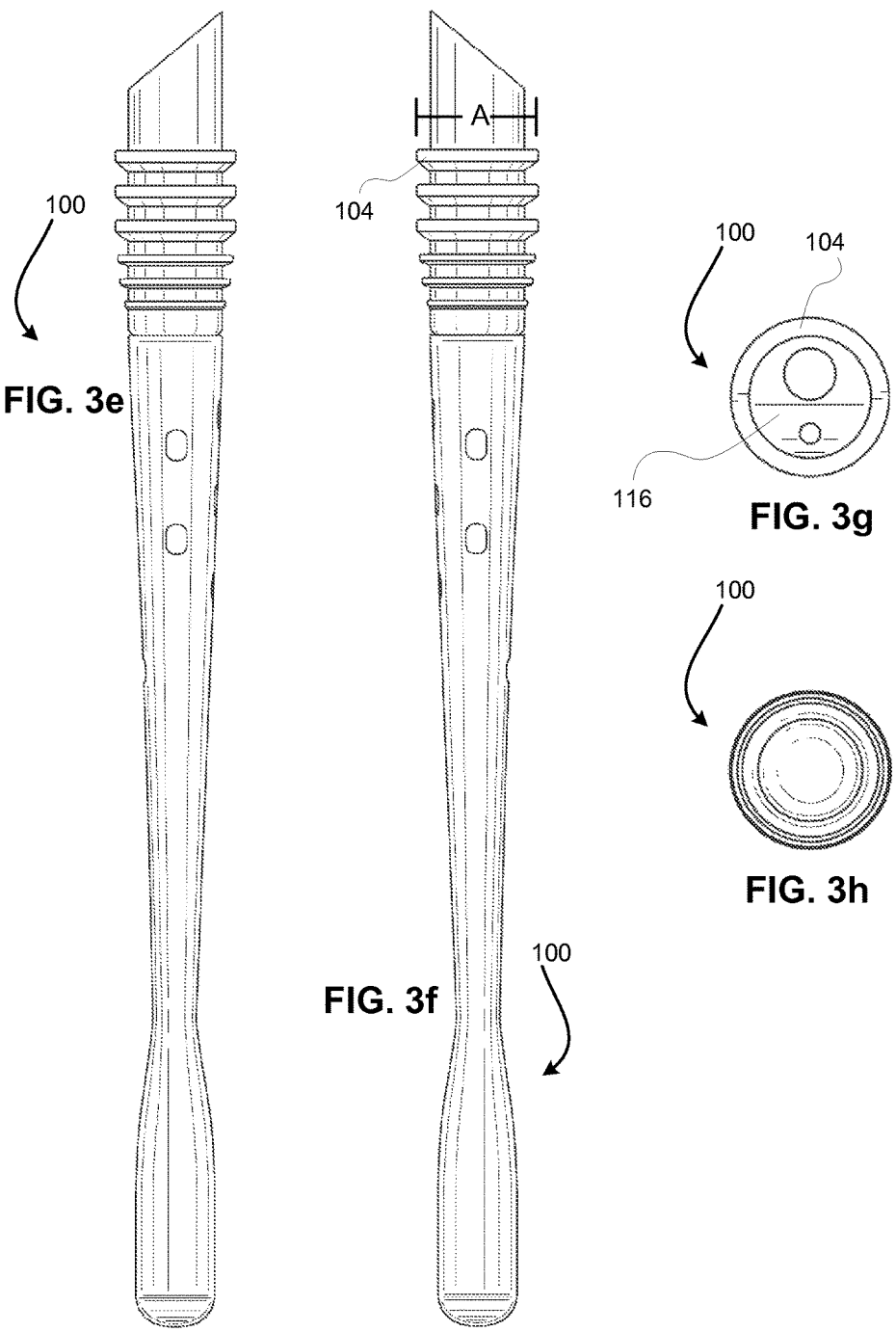

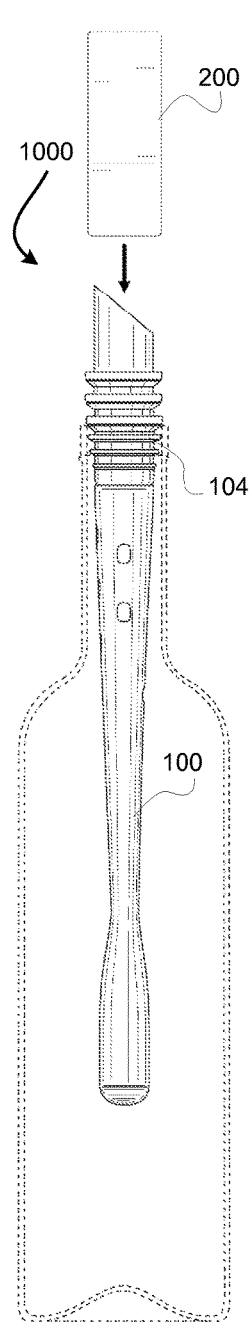 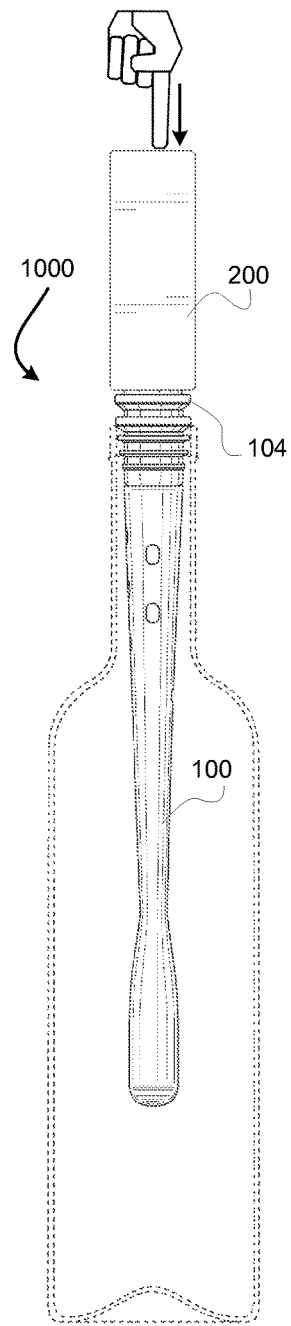 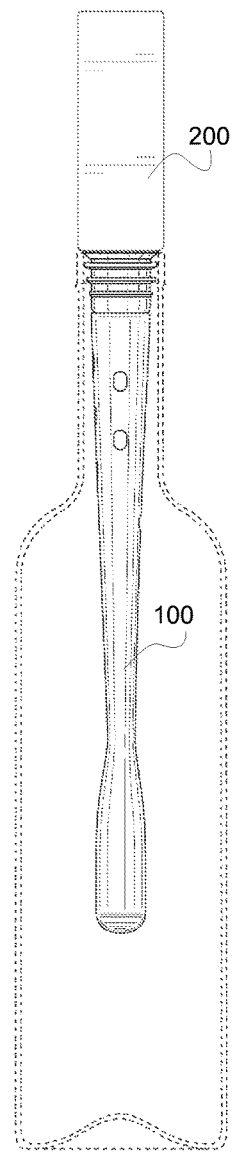
FIG. 5a　　FIG. 5b　　FIG. 5c

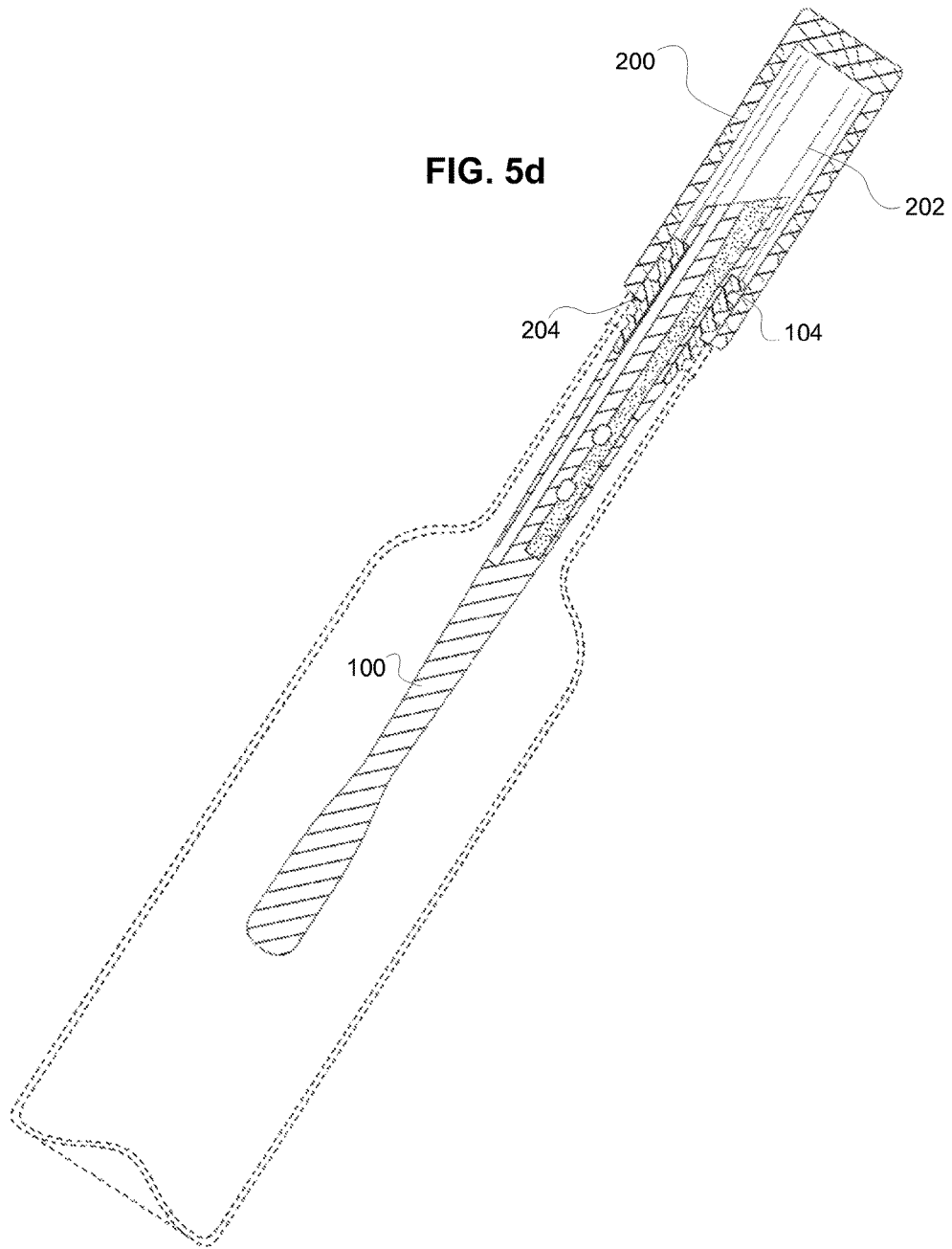

BEVERAGE MULTI-TOOL

PRIORITY CLAIM

This application constitutes a continuation-in-part of, and claims priority from, U.S. Design patent application Ser. No. 29/543,453 filed Oct. 23, 2015. The foregoing application is hereby incorporated by reference in its entirety as if fully set forth herein.

BACKGROUND OF THE INVENTION

Field

This invention relates generally to aging, refining and agitating alcoholic beverages, and more specifically, to a beverage multi-tool.

While devices for use with beverages are known, individually and in combination, a need exists for a simply-constructed beverage multi-tool capable of enhancing the flavor of an alcoholic beverage after the beverage is withdrawn from the cask and bottled, while acting as a stopper, pourer, aerator, muddler and shot measurer in addition to the flavor-enhancing properties.

Description of Previous Disclosures

U.S. Pat. No. 3,942,423 ("Herzfeld"), incorporated by reference herein, discloses a device for aging wine including a wooden rod constructed of oak (e.g. white oak, including quercus alba and quercus bicolor) having a stopper end and an opposing end which extends into the wine to attempt to obtain aging qualities similar to those obtained in a wooden cask. The device is limited to use with a 5 gallon carboy, and has no provision for pouring or aerating liquid from the vessel into which it is inserted nor the ability to act as a muddler.

WIPO Patent Application Publication WO 2011/141773 ("Veggerby"), incorporated by reference herein, discloses a plug fitting into a container with a rubber-like tightening arrangement and circumferential ribs for obtaining a seal between the device and the bottle, the device capable of aerating a beverage from within. The disclosure has no ability to act as a muddler, does not offer a vent or breather tube, does not enhance the flavor of the contained beverage over time, has no shot measurer nor is the tightening arrangement designed for retaining the shot measurer.

U.S. Patent Application Publication No. 2012/0156345 ("Agarwal"), incorporated by reference herein, discloses a device defining a liquid passageway for a liquid flow from a bottle, a barrel lumen for admitting airflow as a vacuum break and having a sealing gasket for frictionally retaining the device in the bottle. The device has irregularly shaped internal channels that would be difficult to construct from oak in a one-piece arrangement, offers no means for changing the flavor of the liquid in the bottle, and has no ability to act as a muddler.

U.S. Design Pat. No. D221,201 ("Gordon"), incorporated by reference herein, discloses a combined drink muddler and sipper designed for use as a straw for an already-poured beverage. The disclosure is silent as to the ability to act as a bottle stopper, aerator or flavor enhancer.

U.S. Pat. No. 8,523,019 ("Drobot"), incorporated by reference herein, discloses a stopper style pourer including aeration and an air supply channel to balance loss of fluid. The device has no means of enhancing the flavor of the contained beverage or muddling.

SUMMARY

The foregoing discussion of previous disclosures demonstrates that a simply-constructed device capable of enhancing the flavor of an alcoholic beverage after being withdrawn from the cask and bottled, while acting as a stopper, pourer, aerator, muddler and shot measurer in addition to the flavor-enhancing properties, has not been produced. Yet a need in the market for such a combined item exists. Obtaining a stopper, pourer, aerator, muddler and shot measurer separately would be more expensive than the combination device disclosed herein. The separately-obtained devices would take up more storage space and have no provision for enhancing the flavor of an alcoholic beverage by imparting flavor, color, and aroma. The invention disclosed herein fills the need in a simply-produced package constructed from a single piece of toasted white oak for optimal flavor enhancement, and is capable of being utilized with either wine or liquor.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings:

FIGS. 3e, 3f, 3g and 3h are a left side view, a right side view, a front view and a back view of appliance 100, in accordance with an embodiment of the invention.

FIGS. 5a, 5b and 5c are environmental views of a beverage multi-tool, in accordance with an embodiment of the invention.

FIG. 5d is a cutaway environmental view of a beverage multi-tool, in accordance with an embodiment of the invention.

DETAILED DESCRIPTION

This invention relates generally to aging, refining and agitating alcoholic beverages, and more specifically, to a beverage multi-tool. Specific details of certain embodiments of the invention are set forth in the following description and in FIGS. 1-6 to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

Figure 1:
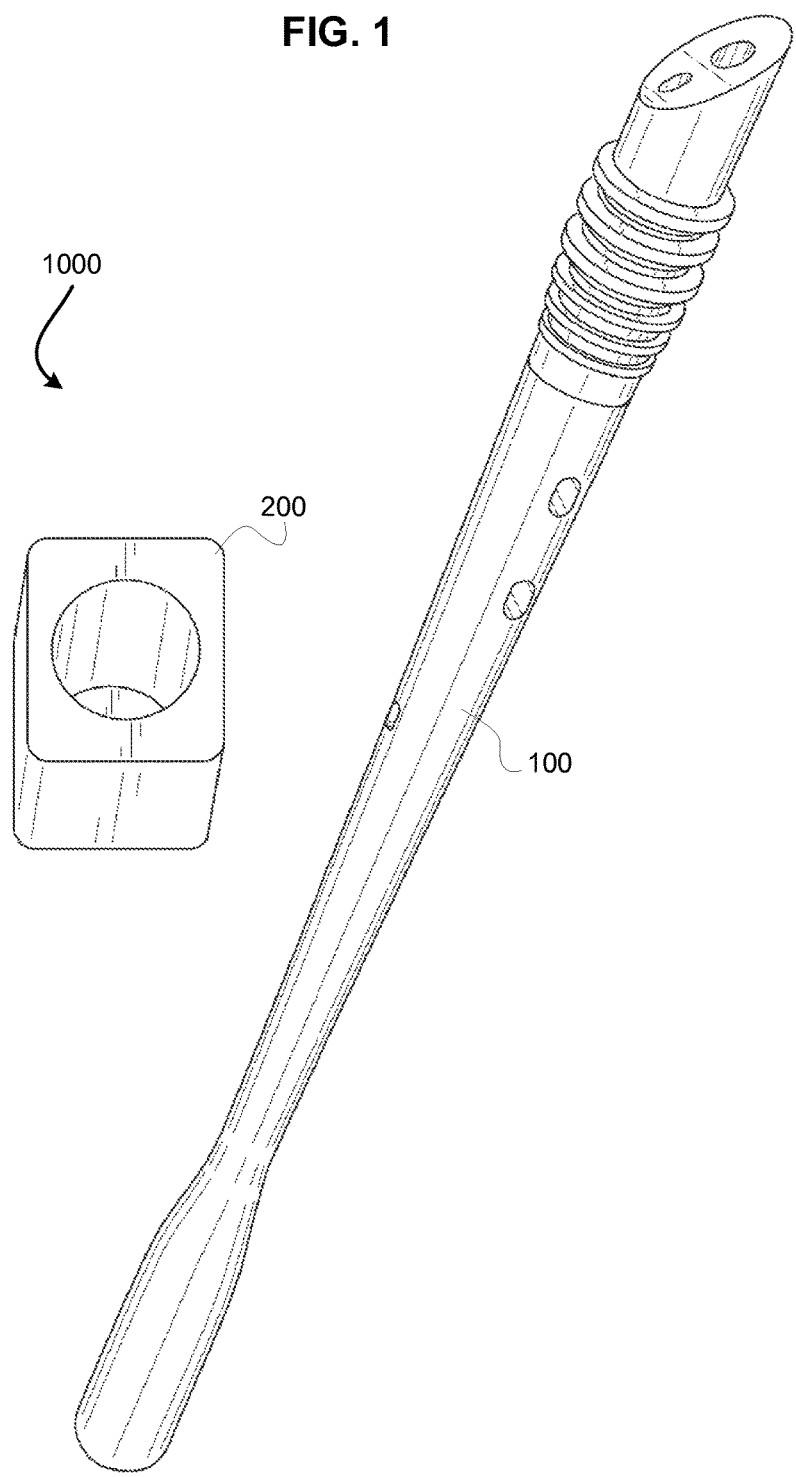
FIG. 1 is a perspective view of a beverage multi-tool, in accordance with an embodiment of the invention.

FIG. 1 is a perspective view of a beverage multi-tool, in accordance with an embodiment of the invention. Beverage multi-tool 1000 includes an appliance 100 and a cap 200. The appliance functions as a pourer, stopper, aerator, muddler and flavor enhancer. The cap also functions as a shot measurer and drinking receptacle.

Figure 2:
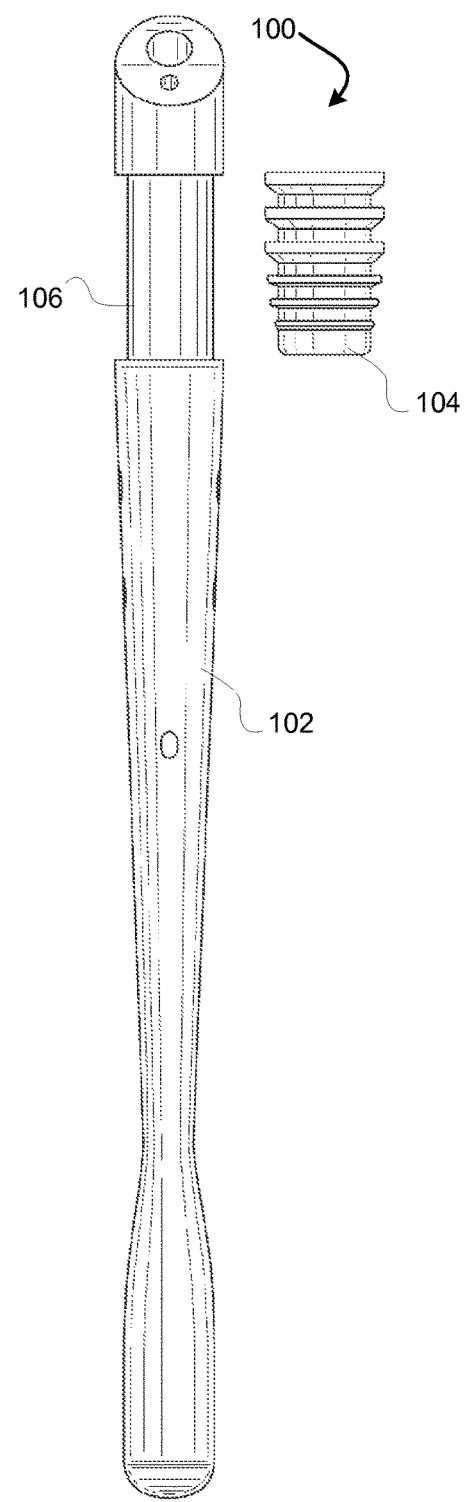
FIG. 2 is an exploded view of appliance 100, in accordance with an embodiment of the invention.
Figures 3A, 3B:
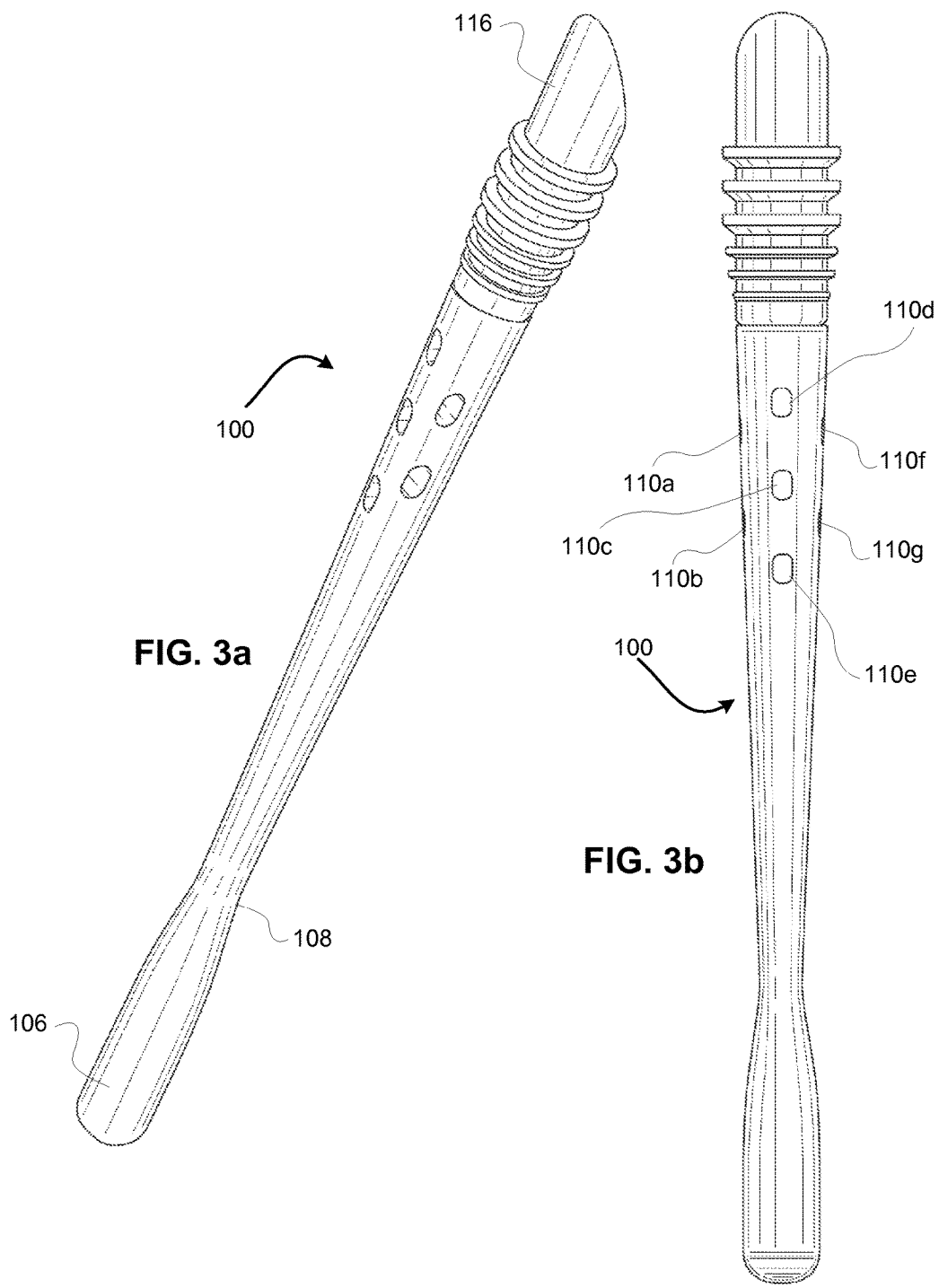
FIGS. 3a, 3b, 3c and 3d are a perspective view, a bottom view, another perspective view and a top view of appliance 100, in accordance with an embodiment of the invention.
Figure 3C:
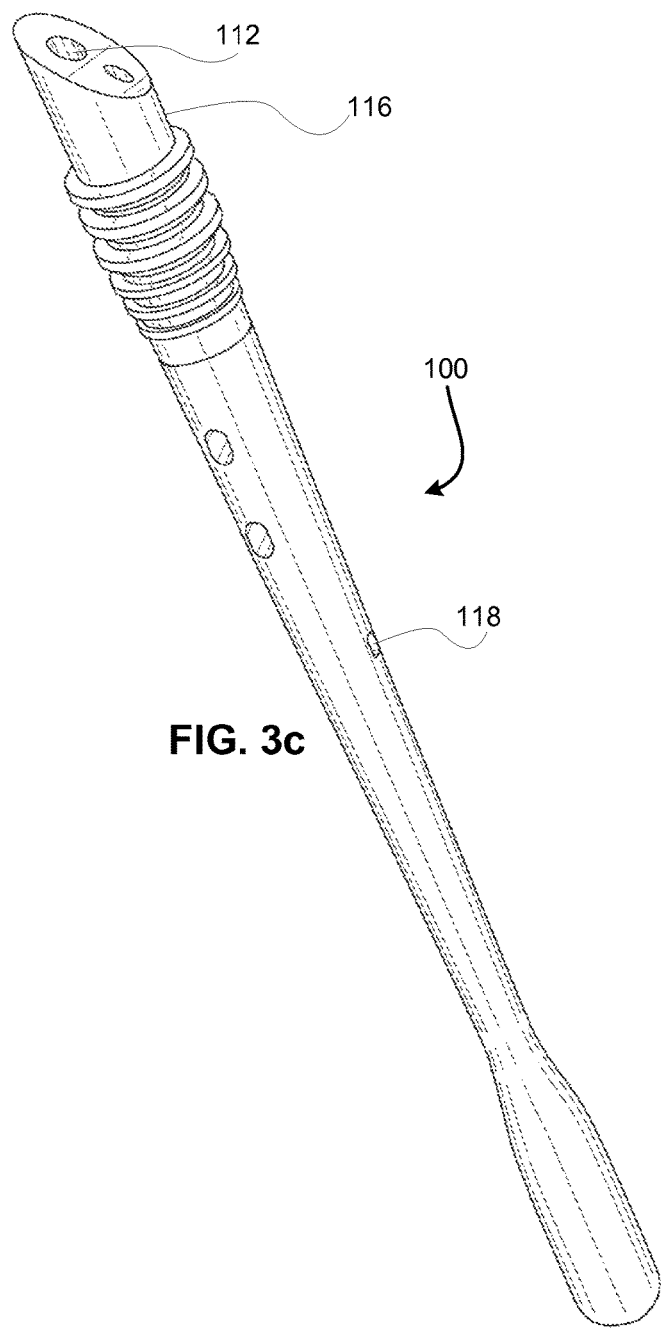
Figure 3D:
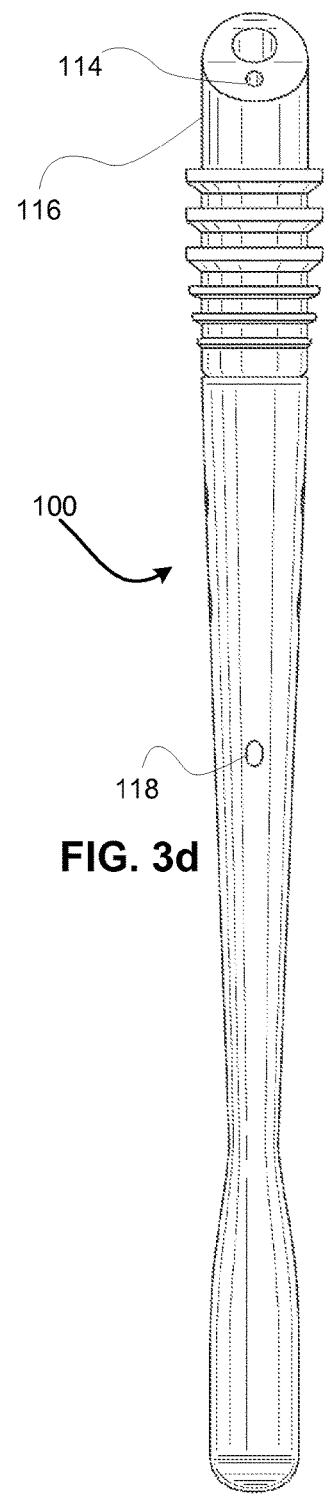

FIG. 2 is an exploded view of appliance 100, in accordance with an embodiment of the invention. In some embodiments, appliance 100 includes an extension 102 and a grommet 104. The extension has a cutout region 106 for receiving the grommet. In some embodiments, the extension is fabricated from a single piece of wood, which may include a single piece of solid white oak. The solid white oak may be toasted (i.e. cooked and/or heated). Toasting the white oak ensures that when the appliance is placed into a container and comes into contact with a wine or spirit, the toasted white oak continues imparting flavor, color, and/or aroma to the beverage after the beverage is removed from the barrel in which it is aged.

In some embodiments, the grommet is fabricated from rubber or other material with stretchable, compressible and/or resilient properties. The appliance is assembled by stretching the grommet to facilitate insertion of the extension through a channel disposed through the center of the grommet. The stretched grommet is released upon the extension being inserted to the cutout region. The inside diameter of the grommet is slightly smaller than the thickness of the cutout region (slightly smaller meaning approximately one sixteenth of an inch or 1-2 millimeters) such that the grommet is tensionally held in place around the extension.

FIGS. 3a, 3b, 3c and 3d are a perspective view, a bottom view, another perspective view and a top view of appliance 100, in accordance with an embodiment of the invention. FIGS. 3e, 3f, 3g and 3h are a left side view, a right side view, a front view and a back view of appliance 100, in accordance with an embodiment of the invention. At one end of the appliance is a muddler 106. At the opposing end of the appliance is the pourer end 116. A grip 108 is disposed near the muddler. The grip is a tapered portion of the appliance configured for enabling a user to hold the appliance while, for example, muddling ingredients for a beverage or other ingestible. Located at the pourer end are two apertures, including air ingress 114 and liquid egress 112. Seven liquid ingress holes 110a through 110g are present in and around the bottom (ventral) side of the appliance. An air egress 118 is present on the top (dorsal) side of the appliance. (It will be seen with respect to FIG. 6 that an air channel internal to the appliance connects the air ingress and air egress. Further, it will be seen with respect to FIG. 6 that a liquid channel internal to the appliance connects the seven liquid ingress holes with the liquid egress hole.) Grommet 104 includes a plurality of concentric rings having a generally circular shape, some of which vary in outer diameter. Particularly, rings closest to the muddler have a smaller outer diameter and rings closest to the pourer end have a larger outer diameter. In some embodiments, the three rings closest to the pourer end may have the same outer diameter, which is marked in FIG. 3f as diameter A. It will be noted in FIG. 3g that surrounding a front face of the pourer end is a top surface of the topmost ring (i.e. the ring closest to the pourer end) of the grommet. The number of rings and their size may vary; a grommet may have more or fewer rings, but at least two rings are needed: a first for tensionally holding the appliance in a bottle of either wine or liquor, and a second for tensionally coupling the cap with the appliance.

Figure 4A:
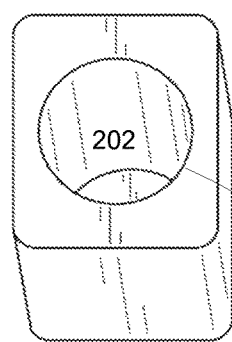
FIGS. 4a, 4b and 4c are a perspective view, a top view and a bottom view of cap 200, in accordance with an embodiment of the invention.
Figure 4B:
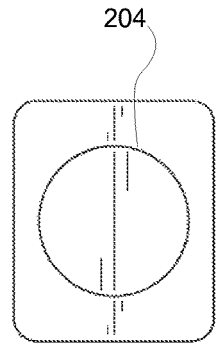
Figure 4C:
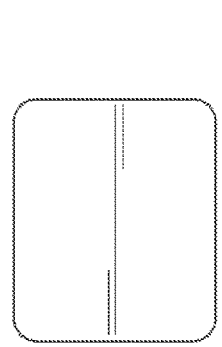
Figure 4D:
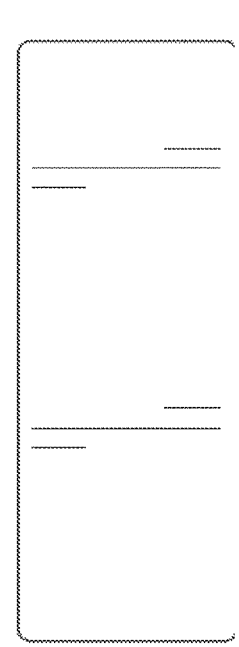
FIGS. 4d, 4e and 4f are a front view, a side view and a front cross-sectional view of cap 200, in accordance with an embodiment of the invention.
Figure 4E:
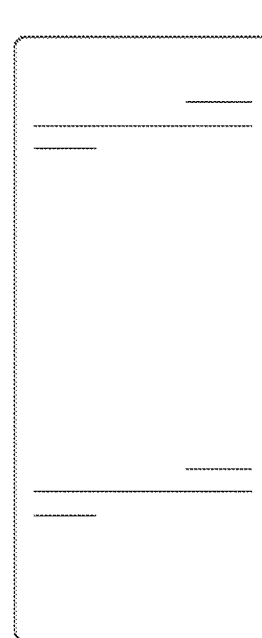
Figure 4F:
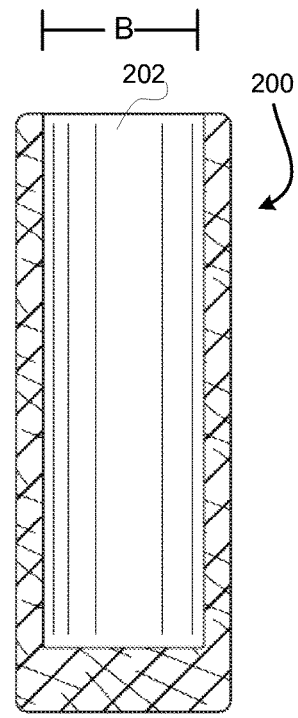

FIGS. 4a, 4b and 4c are a perspective view, a top view and a bottom view of cap 200, in accordance with an embodiment of the invention. FIGS. 4d, 4e and 4f are a front view, a side view and a front cross-sectional view of cap 200, in accordance with an embodiment of the invention. In some embodiments, the cap may have a generally rectangular appearance. In different embodiments, the cap may have a cylindrical appearance or a tapered and/or fluted appearance to resemble a shot glass. The cap includes an aperture 204 through its top face, the aperture leading to receptacle 202. Receptacle 202 is generally cylindrical and configured for receiving a liquid or other product. In some embodiments a line or other marking may be engraved in an interior portion of the receptacle for measuring a standard volume of liquid. In this fashion the cap may function as a shot measurer and/or a shot glass. As will become apparent in discussion regarding FIGS. 5a-5c, the receptacle may also facilitate use of the cap to cover the pourer end of the appliance. The bore, width or inner diameter of the receptacle, marked in FIG. 4f as diameter B, is slightly smaller than diameter A referred to above with respect to FIG. 3f (slightly smaller meaning approximately one sixteenth of an inch or 1-2 millimeters). In some embodiments, diameter B is bored to tensionally accept a standard wine bottle cork (i.e. the diameter B is slightly smaller than the diameter of the standard wine bottle cork and/or diameter B is the same diameter as the interior diameter of the neck of a standard wine bottle) so that a user of the beverage multi-tool can insert the cork into the bore of the cap so that the cork will be retained within the cap through the compression of the cork to the diameter of the bore during insertion of the cork into the cap. Whether a cork is provided with the appliance or the cap, or whether a cork is obtained from another source, a user may thus utilize the cap in conjunction with the cork as a one-shot flask standing alone from the appliance.

FIGS. 5a, 5b and 5c are environmental views of a beverage multi-tool, in accordance with an embodiment of the invention. FIG. 5d is a cutaway environmental view of a beverage multi-tool, in accordance with an embodiment of the invention. FIGS. 5a, 5b, 5c and 5d depict a typical use for the beverage multi-tool 1000 in conjunction with a beverage (either wine or liquor) contained by a bottle, the bottle shown in dashed lines indicating that the bottle is not a claimed part of the invention. FIG. 5a depicts the appliance having been inserted into the bottle, and being held in place tensionally through compression of one of the concentric rings around grommet 104. It may be seen that by including different size rings towards the pourer end of the appliance, the appliance may be inserted into and held in place tensionally by bottle necks of varying widths. For example, if a bottle had a smaller diameter neck and opening, one of the smaller rings towards the pourer end of the appliance would come into tensional contact with the inner surface of the neck, holding the appliance in place. If the bottle had a larger diameter neck and opening, one of the larger rings towards the pourer end of the appliance would instead come into tensional contact with the inner surface of the neck to hold the appliance in place. Particularly, unlike previously-disclosed inventions in this arena which are targeted for either wine or liquor but not both, the invention functions with either wine bottles or spirit bottles. Neither specific diameters nor a number of rings are claimed; larger or smaller numbers of rings and/or differing diameters may be included with the appliance to facilitate use with a larger or smaller variety of bottles.

In the present example, it may be seen that the three larger rings having the same diameter extend from the opening of the bottle towards the pourer end. The three larger rings are used for receiving the receptacle 202 via the aperture 204 of the cap 200 to "close" the bottle by using the cap as a closure device for the bottle. The slightly larger diameter A of the rubber rings of the rubber (or similar material) grommet compressibly provide tension with the smaller bore B of the cap, holding the cap in place over the rings. Additional rings of the same diameter may be provided near the pourer end to provide greater stability by increasing the tensional hold between the cap and grommet of the appliance.

It may be seen that at least a portion of the appliance extends into the cavity of the bottle in which the liquid is stored. The flavor of the liquid will thus be enhanced as the aging process of liquor or wine begun in the barrel or cask is continued via the portion of the oak wood appliance being submerged in the liquid during storage of the bottle. Particularly, the toasted white oak continues the process of imparting flavor, color and aroma to whatever liquor or wine the product is in. Therefore, the appliance portion of the beverage multi-tool functions as both a stopper and flavor enhancer.

Figure 6:
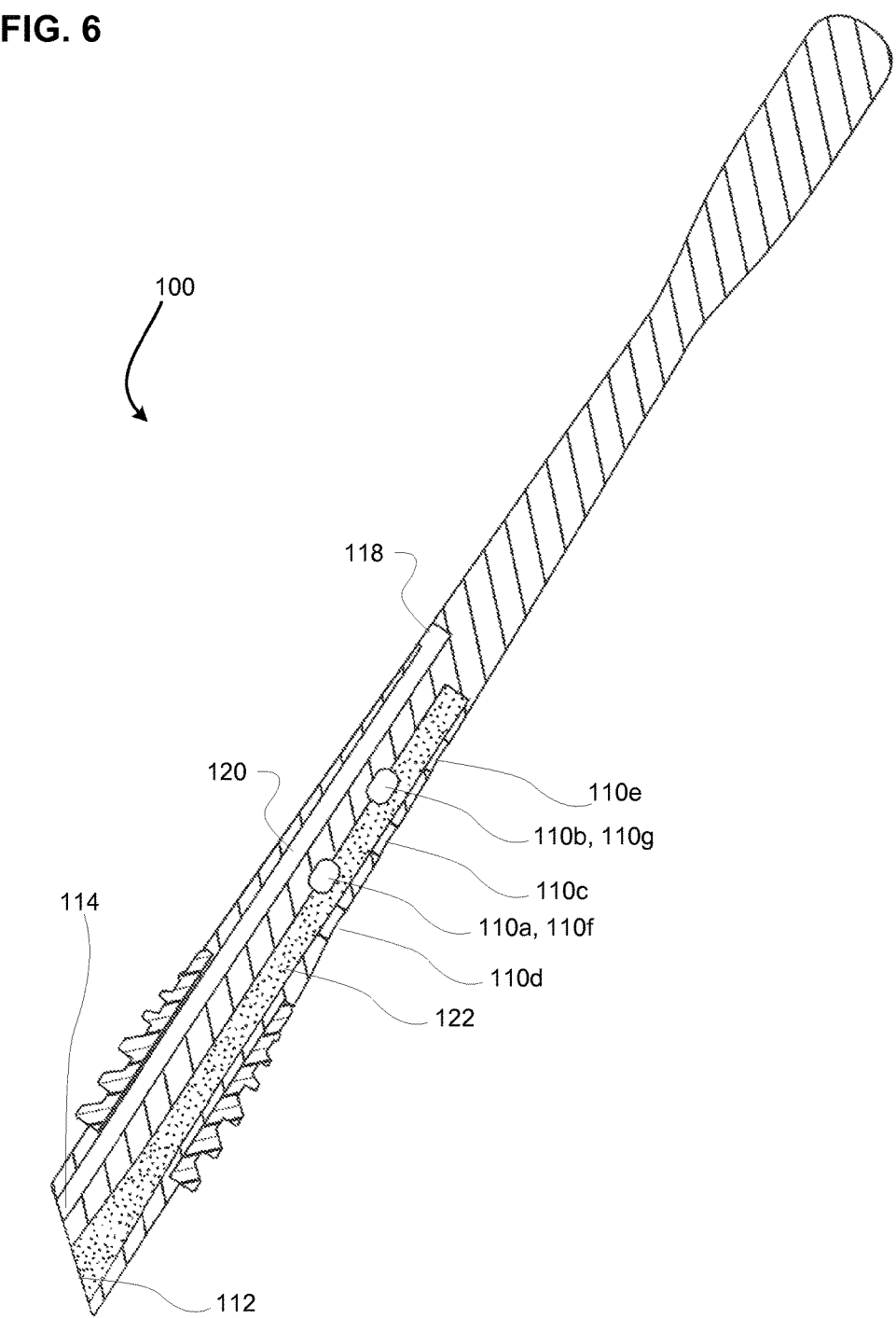
FIG. 6 is a cross-sectional view of the appliance 100, in accordance with an embodiment of the invention.

FIG. 6 is a cross-sectional view of the appliance 100, in accordance with an embodiment of the invention. Internal to the appliance may be two channels, including an air channel 120 and a liquid channel 122. The air channel is disposed between the air ingress 114 at the pourer end of the appliance and the air egress 118. The liquid channel is disposed between the liquid egresses 110a-110g and the liquid egress 112 located at the pourer end. When the neck of a bottle into which the appliance has been inserted is tilted downward, liquid from inside the bottle will enter the appliance through the seven liquid ingress apertures 110a-110g and will exit the appliance through the liquid egress aperture. The liquid ingress apertures are separated from one another in such a way that liquid traversing the liquid channel is aerated. Additionally, air may traverse the air channel while liquid is inside the liquid channel, breaking any vacuum which would otherwise exist in the bottle while the liquid is exiting. Thus, the appliance portion of the beverage multi-tool functions as a pourer and aerator in addition to functionalities described elsewhere herein.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An appliance for a bottle, comprising:
   a pourer;
   a muddler;
   an extension, the extension disposed between the pourer and the muddler, the extension including at least a tapered portion having a diameter which narrows along a longitudinal axis of the appliance;
   a grommet received by a cutout of the extension, the cutout of the extension disposed adjacent to the pourer;

an air channel disposed through at least a portion of the appliance; and a liquid channel disposed between a liquid egress of the pourer and a liquid ingress arrangement, the liquid ingress arrangement including at least three rows each having two or more liquid ingress holes, the at least three rows running longitudinally along the tapered portion of the extension, wherein a degree of tapering of the tapered portion provides varying liquid ingress hole spacing of the at least three rows radially about the extension.

2. The appliance for a bottle of claim 1, further comprising:

a grip disposed adjacent to the muddler.

3. The appliance for a bottle of claim 1, wherein the muddler comprises:

a rounded end of the appliance configured for at least one of muddling or mashing ingredients.

4. The appliance for a bottle of claim 1, further comprising:

the appliance composed of toasted white oak.

5. The appliance for a bottle of claim 1, further comprising:

a cap for providing a closure over a bottle in which the appliance is inserted.

6. The appliance for a bottle of claim 5, wherein the cap for providing a closure over a bottle in which the appliance is inserted comprises:

the cap including at least a measurement mark.

\* \* \* \* \*